United States Patent
Prins

(10) Patent No.: US 8,745,801 B2
(45) Date of Patent: Jun. 10, 2014

(54) GANGWAY CONSTRUCTION HAVING A GUIDING ASSEMBLY WITH PULLEY WHEELS AND GUIDING CABLES

(75) Inventor: Willem Frederik Prins, Zandvoort (NL)

(73) Assignee: Offshore Solutions B.V., Ijmuiden (NL)

( * ) Notice: Subject to any disclaimer, the term of this patent is extended or adjusted under 35 U.S.C. 154(b) by 0 days.

(21) Appl. No.: 13/877,863

(22) PCT Filed: Oct. 3, 2011

(86) PCT No.: PCT/NL2011/050666
§ 371 (c)(1),
(2), (4) Date: Jun. 14, 2013

(87) PCT Pub. No.: WO2012/047096
PCT Pub. Date: Apr. 12, 2012

(65) Prior Publication Data
US 2013/0255012 A1    Oct. 3, 2013

(30) Foreign Application Priority Data

Oct. 5, 2010 (NL) ..................................... 2005453

(51) Int. Cl.
*E01D 15/10* (2006.01)
*B63B 27/14* (2006.01)
*B64F 1/30* (2006.01)

(52) U.S. Cl.
CPC .. *B63B 27/14* (2013.01); *B64F 1/30* (2013.01)
USPC ............... 14/72.5; 14/69.5; 14/71.1; 114/362

(58) Field of Classification Search
CPC .................................. B64F 1/30; B63B 27/14
USPC ....................... 14/31–49, 69.5–72.5; 114/362
See application file for complete search history.

(56) References Cited

U.S. PATENT DOCUMENTS 1,674,279 A * 6/1928 Ebeling ........................ 14/69.5
2,607,937 A * 8/1952 Stone ............................ 14/69.5
(Continued)

FOREIGN PATENT DOCUMENTS

EP    1 315 651 B1    8/2006
JP    7 251791 A    10/1995
WO    2008025345 A1    3/2008

OTHER PUBLICATIONS

International Search Report mailed Feb. 16, 2012 (PCT/NL2011/050666); ISA/EP.

*Primary Examiner* — Raymond W Addie
(74) *Attorney, Agent, or Firm* — Banner & Witcoff, Ltd.

(57) ABSTRACT

A gangway construction 1 for providing access between a vessel 3 and an offshore object 33 comprises a support frame 2 and a movably guided gangway 10. A guiding assembly comprises an upper and lower rotatable pulley wheel 5, 6. A first cable 8 is connected to the frame or the gangway at a forward and backward connecting position 16, 17 and extends in a longitudinal direction between this forward and backward connecting position. With this the first cable 8 extends from its forward connecting position 16 towards the lower pulley wheel 6, is guided in for example a counter clockwise direction along at least part of the circumference of the lower pulley wheel 6 and in for example a clockwise direction over at least part of the circumference of the upper pulley wheel 5, and from the upper pulley wheel 5 extends towards its backward connecting position 17.

20 Claims, 3 Drawing Sheets

(56) References Cited

U.S. PATENT DOCUMENTS

| | | | |
|---|---|---|---|
| 3,654,653 A * | 4/1972 | Eggert et al. | 14/69.5 |
| 4,003,473 A * | 1/1977 | Ryan | 14/71.7 |
| 5,085,165 A | 2/1992 | Reed | |
| 5,234,285 A | 8/1993 | Cameron | |
| 5,305,486 A * | 4/1994 | Smith et al. | 14/69.5 |
| 5,393,192 A * | 2/1995 | Hall et al. | 414/537 |
| 7,228,582 B1 * | 6/2007 | Jones et al. | 14/71.1 |
| 8,302,237 B2 * | 11/2012 | Shimizu et al. | 14/71.5 |

* cited by examiner

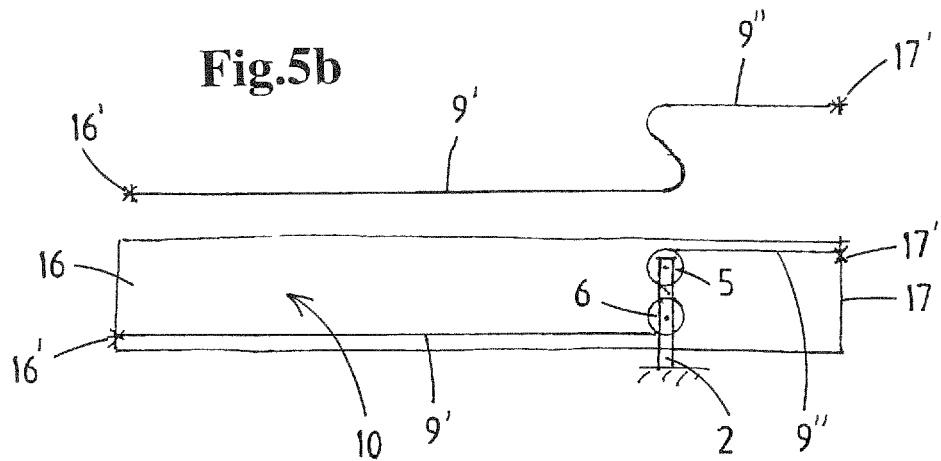
Fig.5b
Fig.5a
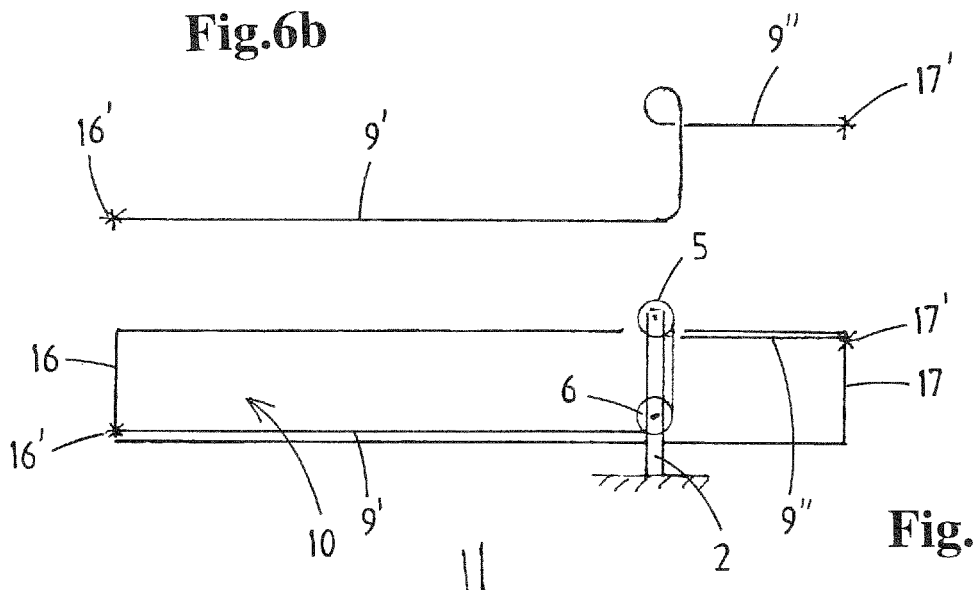
Fig.6b
Fig.6a
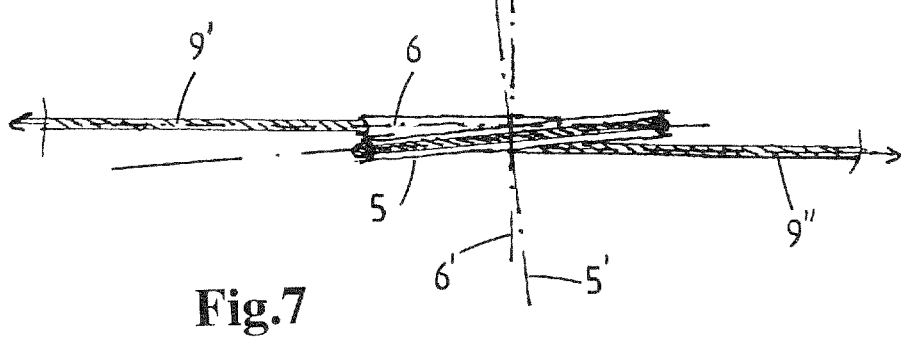
Fig.7

GANGWAY CONSTRUCTION HAVING A GUIDING ASSEMBLY WITH PULLEY WHEELS AND GUIDING CABLES

The present application is a U.S. National Phase filing of International Application No. PCT/NL2011/050666, filed on Oct. 3, 2011, designating the United States of America and claiming priority to Dutch Patent Application No. 2005453, filed Oct. 5, 2010, and the present application claims priority to and the benefit of all the above-identified applications, which are incorporated by reference herein in their entireties.

The invention relates to a gangway construction for providing access between a vessel and an offshore object.

Such a gangway construction is for example known from EP 1 315 651. Here a vessel is shown which is provided with a telescopingly extendable gangplank. The gangplank has one end moveably mounted on the vessel about a horizontal and a vertical axis. At its free end the gangplank is provided with a coupling device. The coupling device is adapted to enclose a vertically directed engagement rod that projects from an offshore pole body, for example the mast of an offshore windmill. During use the vessel is sailed to a position close to the engagement rod on the offshore pole body. Subsequently the gangplank is rotated towards the engagement rod after which the gangplank is retracted until the coupling device is accurately positioned in front of the engagement rod. The coupling device is then hydraulically actuated in such a way that it encloses itself around the engagement rod. As soon as the coupling device has become coupled to the engagement rod, the other degrees of freedom of the gangplank are released. The gangplank then gets the full freedom to freely telescopingly extend or retract and to freely rotate around its horizontal and vertical axis. This is necessary in order to prevent damaging of the vessel, the gangway construction and/or the offshore pole body. During the coupling procedure as well as during the time the coupling device remains coupled to the engagement rod, the vessel is dynamically positioned by means of a suitable actuation of its screw(s), such that it remains substantially in the same position in front of the offshore pole body.

A disadvantage with the known gangway construction is that it is rather complex and heavy. For example it comprises a large number of moving parts, supporting elements and guiding organs, as well as heavy hydraulic systems for moving those parts relative to one another and accurate sensors for monitoring the various movements. A malfunctioning of the system can easily appear, for example in the case of one of the sensors giving a disturbed signal to a control system. If for example one of the hydraulic systems for rotating the gangway around its x- and/or y-axes or for telescopingly extending or retracting the gangway is given free too late after the coupling device has already been fixedly coupled to the engagement rod, then large damages may be caused to the gangway construction on the vessel or to the engagement rod on the offshore pole body. Another disadvantage is that the gangplank during a coupling action may bump one or more times against the engagement rod of the offshore pole body, particularly at heavy sea. Because of the heavy weight of the gangplank this also may lead to seriously damaging of the gangway construction on the vessel or lead to damage to the engagement rod on the offshore pole body. Furthermore, the heavy weight of the gangplank requires heavy and complex hydraulic systems for moving it, which hydraulic systems need a lot of energy and are vulnerable for failure.

The present invention aims to overcome one or more of the above disadvantages and/or to provide a useable alternative. In particular the invention aims to provide a gangway construction which is mechanically and electronically uncomplicated and which has such a light weight that damaging during a coupling action is far less likely to occur, even at heavy sea.

This aim is achieved by a gangway construction according to claim 1. The gangway construction comprises a support frame mounted to the vessel or the offshore object. A guiding assembly is provided on a guiding part of the support frame. A longitudinal gangway is movably guided over the guiding assembly in a longitudinal direction relative to the frame. According to the inventive thought the guiding assembly comprises at least a first subassembly of an upper and lower pulley wheel cooperating with a first cable. The upper and lower pulley wheel are mounted rotatable to either one of the frame and the gangway, that is to say either they are both connected to the frame, either they are both connected to the gangway. The respective axis of rotation of the set of two pulley wheels, which in particular are formed by horizontally directed axis of rotation which extend substantially transverse to the longitudinal direction of the gangway, are positioned at a vertical distance from each other. The first cable is fixedly connected with both of its outer ends to the other one of the frame and the gangway, that is to say the cable is connected with both of its outer ends with the one of the frame and gangway with which the abovementioned set of pulley wheels are not connected. If the set of pulley wheels is connected to the frame then the outer ends of the cable are connected to the gangway. If on the other hand the set of pulley wheels is connected to the gangway then the outer ends of the cable are connected to the frame.

The cable is fixedly connected to this other one of the frame and gangway at a forward and backward connecting position. With forward and backward connecting position it is meant that they respectively lie at front and back sides of the set of pulley wheels at horizontal distances from each other. One cable end is fixedly connected at the forward connecting position which lies at a front side of the pulley wheels and the other cable end is fixedly connected at the backward connecting position at a back side of the pulley wheels. The cable extends in the longitudinal direction of the gangway between this forward and backward connecting position along at least part of said other one of the frame and the gangway. With this the first cable, seen in said longitudinal direction, extends from its forward connecting position towards the lower pulley wheel, then is guided, in for example a counter clockwise direction, along at least part of the back side of the circumference of the lower pulley wheel after which it is guided, in for example a clockwise direction, over at least part of the front side of the circumference of the upper pulley wheel. From the upper pulley wheel the cable extends towards its backward connecting position.

During a moving of the gangway in the longitudinal direction, the cable is run over the pulley wheels to be displaced in a bigger or lesser amount towards the forward or backward side of the set of pulley wheels. Since the cable is fixedly mounted to said other one of the frame and the gangway, this said other one of the frame and the gangway is forced to move along with either the cable or the pulley wheels in the forward or backward direction relative to said other one of the cable and pulley wheels and the support frame. Thus, the gangway is smoothly guided in its longitudinal direction by means of the cable running over the pulley wheels, or by means of the pulley wheels running over the cable. Since the cable is fixedly mounted with both of its outer ends at the forward and backward connecting positions, those forward and backward connecting positions are also forced to move forward or backward relative to the set of pulley wheels while at the same time the cable runs over the rotating pulley wheels. Thus use is being made of the fixed available length of cable present between the forward and backward connecting positions.

In the variant in which the pulley wheels are connected to the "fixed" frame and the cable ends are connected to the "movable" gangway, the backward and forward connecting positions are translatable back and forth relative to the pulley wheels while the cable can be run over the rotatable pulley wheels. In the variant in which the cable ends are connected to the "fixed" frame and the pulley wheels are connected to the "movable" gangway, the pulley wheels are translatable as a set back and forth in between the forward and backward connecting positions. In both cases the vertical distance between the pulley wheels remains the same. The pulley wheels are mounted to a same first constructional part (the frame or the gangway) and as such are fixated relative to each other. Likewise, in both cases the horizontal distance between the forward and backward connecting positions of the cable ends remains the same. The cable ends are mounted to a same second constructional part (the other one of the frame and the gangway) and as such are also fixated relative to each other. Thus the set of pulley wheels is movable relative to the set of connecting positions or vice versa.

Not only is the gangway smoothly guided in this manner, the subassembly also offers another even more important advantage in that it has the ability to counteract a moment acting on the gangway in the counter clockwise direction around its horizontal connecting position, to be more precise to counteract a moment acting on the gangway in the plane which runs through the cable. This counteraction of such a moment automatically takes place by the loops of the cable running around the back and front sides of the set of pulley wheels being pulled tight against those back and front sides of the pulley wheels. The vertical distance between the axes of rotation of the pulley wheels creates a moment arm which together with reactive tension forces in the cable parts extending between the pulley wheels and the forward and backward connecting positions, is well able to compensate for any moment acting on the gangway around its horizontal rotation axis transverse to the longitudinal direction of the gangway. Such a moment can for example be caused by the centre of mass of the gangway lying at a distance from the horizontal rotation axis. Such a moment no longer needs to be counteracted by a heavily constructed double retaining between the gangway and the support frame. Also the rolling friction of the cable over the pulley wheels needs a relative low force for moving the gangway in the longitudinal direction. This has the advantage that a drive for initiating this movement may also be chosen relative light. All in all this may lead to a substantial saving in weight which in turn further lowers the forces for moving the gangway.

It is noted that JP-07251791 discloses a guiding assembly with guiding rails along which a small wheeled platform can be rolled up and down between a deck of a ship and a wharf in order to transfer passengers there between. In between the guiding assembly a drive construction comprising a pulling cable, a plurality of pulley wheels and a winch is provided. The pulley wheels merely serve the purpose of guiding the cable towards the winch. It is impossible for this drive construction of cable and pulley wheels to act as true guiding means which are also able to take up horizontal weight forces. Also the cable and pulley wheels are unable to counteract a moment acting on the platform. For this the platform truly needs its separate wheel support on the guiding rails.

According to a preferred embodiment of the present invention the cable is guided in a first rotational direction along at least part of the circumference of either the upper or the lower pulley wheel and in a second opposite rotational direction over at least part of the circumference of the remaining other one of the pulley wheels. The cable as it were is then guided meandering along the shape of an S over the two pulley wheels. When a movement takes place between the cable and the pulley wheels, the cable needs to bent in two different directions around the pulley wheels. For example the cable of the first subassembly can be guided in a counter clockwise direction along at least part of the circumference of the lower pulley wheel and in a clockwise direction over at least part of the circumference of the upper pulley wheel.

According to an alternative embodiment the cable is guided in a first rotational direction along at least part of the circumference of one of the pulley wheels and in the same first rotational direction over more than half the circumference of the other one of the pulley wheels. The cable as it were is then guided as an open loop over one of the two pulley wheels and as a closed loop over the other one of the two pulley wheels. When a movement takes place between the cable and the pulley wheels, the cable needs to bent in only one direction around the pulley wheels. This is advantageous for the life span of the cable. It is necessary though to position the rotation axis of the pulley wheel along which the cable is guided as a closed loop, somewhat slanted such that the incoming and outgoing cable ends of the loop can pass by each other. For example the cable of the first subassembly can be guided in a counter clockwise direction along a quarter of the circumference of the lower pulley wheel and in the same counter clockwise direction as a loop over three quarters of the circumference of the upper pulley wheel.

For both embodiments it can be said that a counter clockwise rotation of the gangway, that is to say having the intention to move with its free outer end downwards, can be prevented by the cable running from its forward connecting position first along the back side of the lower pulley wheel and then via the front side of the upper pulley wheel towards the backward connecting position. Both the cable part extending between the forward connecting position and the back side of the lower pulley wheel, as well as the cable part extending between the front side of the upper pulley wheel and the backward connecting position, then get automatically tensioned because of the momentum acting on the gangway. This further tensioning of those cable parts is well able to fully prevent a tipping down of the pending free outer end of the gangway.

The above construction with a first cable running in a particular manner over an upper and lower pulley wheel, is able to counteract a moment in one direction. If it is also desired to counteract a moment in the opposite direction, then a second cable may be provided. This second cable then also needs to extend in the longitudinal direction along at least part of said other one of the frame and the gangway and connected thereto at a forward and backward position. The second cable however needs to be guided in an opposite way over an upper and lower pulley wheel. For this a distinctive set of pulley wheels may be used. It is however also possible to use the same upper and lower pulley wheel as have been used for the first cable. Because of its opposite running direction over the upper and lower pulley wheel, this second cable is able to counteract any moment present on the gangway in the clockwise direction. Such a clockwise rotation of the gangway, that is to say having the intention to move with its pending free outer end upwards, can be prevented by the cable running from its forward connecting position first along the back side of the upper pulley wheel and then via the front side of the lower pulley wheel towards the backward connecting position. Both the cable part extending between the forward connecting position and the back side of the upper pulley wheel, as well as the cable part extending between the front side of the lower pulley wheel and the backward connecting position, then get automatically tensioned because of the momentum acting on the gangway. This further tensioning of those cable parts is well able to fully prevent a moving upwards of the free outer end of the gangway.

In a further preferred embodiment the subassembly also may comprise an upper support rail connected to said other one of the frame and the gangway and extending along at least part thereof, preferably the same part as where the cable(s) are extending along, while resting on one of the pulley wheels. Thus, the vertical load of the gangway from its mass is supported by this pulley wheel. During a movement of the gangway in the longitudinal direction with the cable running over the pulley wheels, at the same time the support rail runs over its pulley wheel or vice versa. Since the pulley wheel is rotated because of the cable running over it, the rotating pulley wheel also acts a driving force on the support rail which further helps to move the gangway at a relative low force. In the alternative the support rail may also be supported on and guided relative to a separate support/guiding organ of the support frame.

The gangway can be moved in its longitudinal direction relative to the frame by means of all kinds of drives, for example a hydraulic drive. In a variant embodiment a drive is provided which acts on at least one of the pulley wheels. By driving at least one of the pulley wheels in rotation, the cable(s) running over this pulley wheel is/are guided over it and pulled from the forward to the backward side of the set of pulley wheels or vice versa. If the support rail is also supported on this driven pulley wheel it is also forced to move relative to the pulley wheel in the longitudinal direction. The gangway moves along with the cable(s)/pulley wheel(s) and/or with the support rail in the longitudinal direction.

Since it is now possible to build the gangway very light weight and smoothly guided, the drive advantageously may even be an electric drive, like an electromotor. Such an electric drive can advantageously be battery operated.

Although it may already be sufficient to only provide a first subassembly, in an advantageous embodiment also a second similar subassembly is provided to have the gangway doubly guided. The first and second subassemblies can then be provided on opposite left and right sides of the gangway with the walking area extending there between. The cable(s), pulley wheel(s) and/or support rail can be integrated in the handrail safety side walls of the gangway. Such handrail safety side walls usually have a height of between 1-1.5 meter, which is high enough for being able to provide the upper and lower pulley wheel at a sufficient vertical distance from each other in between the upper and lower edges of those side walls.

In a variant the guiding assembly may further comprise a third subassembly which comprises a left and a right pulley wheel mounted rotatable to either one of the frame and gangway with their axis of rotation, in particular vertically directed axis of rotation extending transverse to the longitudinal direction of the gangway, positioned at a horizontal sideways distance from each other. Furthermore, the third subassembly comprises a first cable extending in the longitudinal direction along at least part of the other one of the frame and the gangway, preferably the same part of said other one of the frame and the gangway as where the cable(s) of the first and/or second subassemblies extend along. The first cable of the third subassembly is connected to said other one of the frame and the gangway at a forward and backward connecting position and extends from its forward connecting position towards the left pulley wheel, is guided, in for example a counter clockwise direction, along at least part of the back side of the circumference of the left pulley wheel and, in for example a clockwise direction, over at least part of the front side of the circumference of the right pulley wheel, and from the right pulley wheel extends towards its backward connecting position. In this way a moment of the gangway around its vertical axis in one particular direction can be counteracted by a suitable tensioning of the cable of the third subassembly. The support frame does not need to be strengthened for this. If such a counteraction of a moment acting on the gangway in the opposite direction around its vertical axis is also required, then the third subassembly can easily be equipped with a second cable guided in an opposite manner over a left and right pulley wheel.

In a further embodiment the third subassembly may be provided with one or more boundary rails which are guided along the pulley wheels such that the forces acting in the horizontal direction on the gangway can be counteracted while at the same time gaining a smoother guiding of the gangway during its movements in the longitudinal direction.

The cables of the various subassemblies run tight or in other words tensioned in between their connecting positions including their loops around the pulley wheels. Preferably the cable is tightened, in particular up to a tension of at least 1 kN. Thus substantially no play is present in the cable which aids to a solid guidance and immediate ability to counteract any (moment) forces.

At or near a front end of the gangway a coupling device may be present for connecting the gangway to the other one of the vessel and offshore object onto which the gangway construction is not provided. It is however also possible to keep the outer end of the gangway positioned in another manner close to a desired landing position. Then an access along which people can walk from the vessel to the offshore object and vice versa can also be obtained. For example this can be achieved by means of keeping the outer end of the gangway dynamically positioned in front of the desired landing position. Dynamic positioning means for obtaining this goal can be combined with image recognition or suitable sensor means between the outer end of the gangway and the landing position. Further preferred embodiments are a stated in the subclaims.

The invention also relates to a vessel provided with a gangway construction and to a method for providing access between a vessel and an offshore object by means of a gangway construction.

The invention shall be explained in more detail below with reference to the accompanying drawings, in which.

Figure 1:
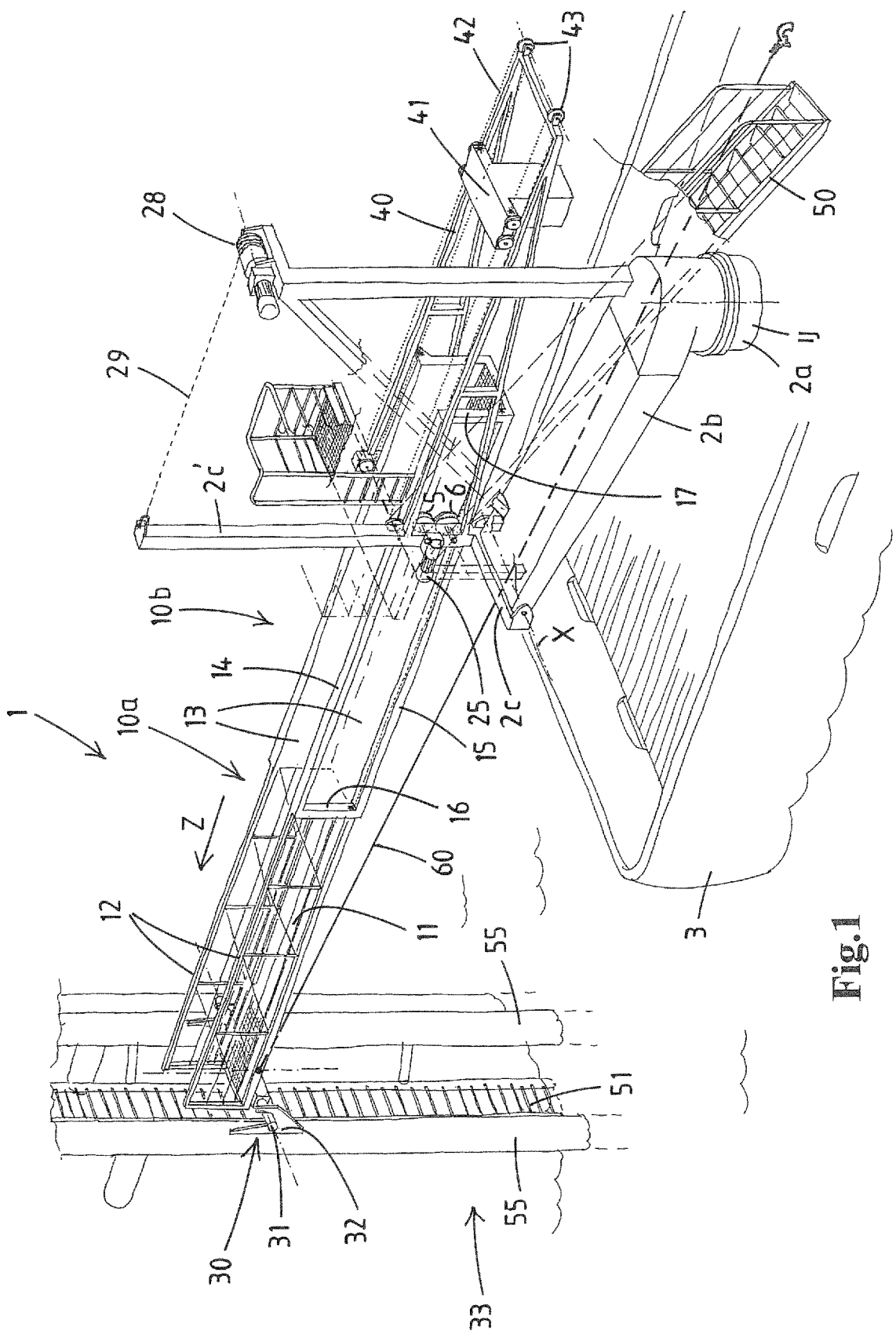
FIG. 1 is a view in perspective of a vessel provided with an embodiment of a gangway construction according to the invention coupled to an offshore object.
Figure 3:
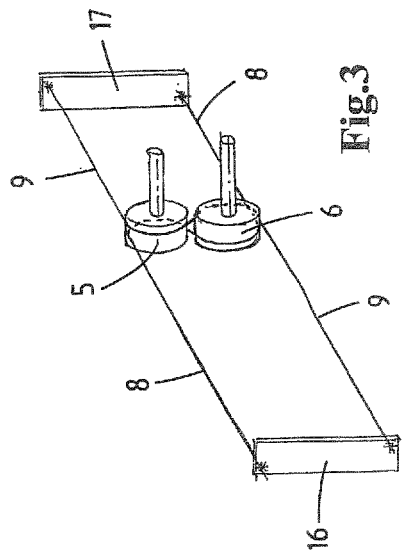
Figure 4:
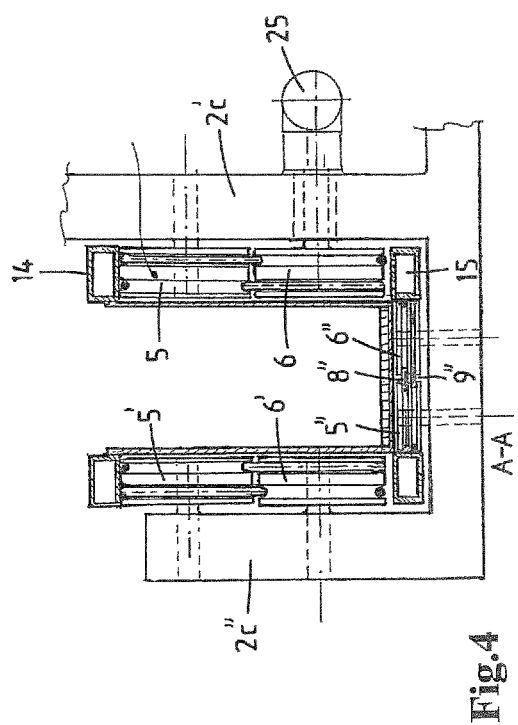
Figure 2:
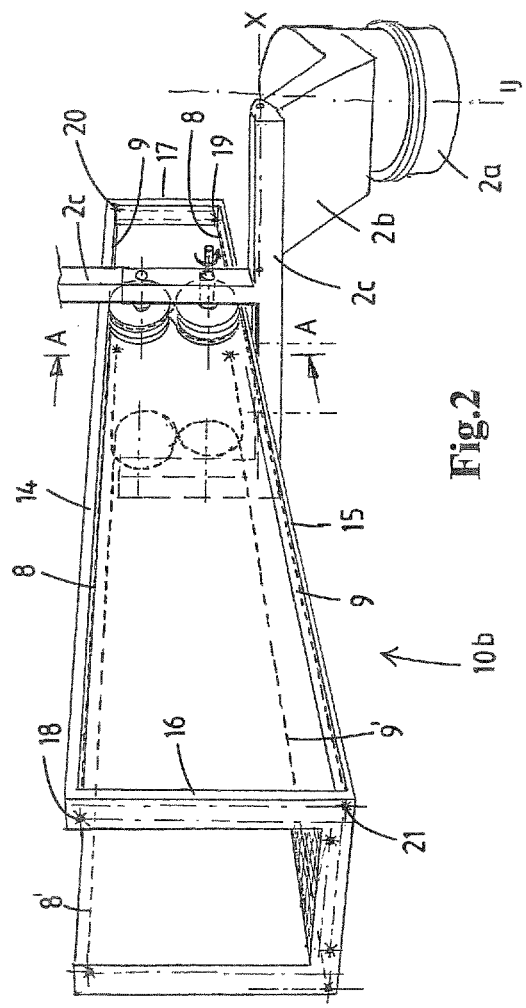
FIG. 2 is a view in perspective of a rear part of the gangway construction of FIG. 1.

FIG. 3 schematically shows a subassembly of two of the cables of FIG. 2 running in opposite directions over their set of pulley wheels;

FIG. 4 shows a cross section over the line A-A in FIG. 2;

FIG. 5 schematically shows the run of one of the two cables of FIG. 1-4;

FIG. 6 shows an alternative run for one of the two cables of FIG. 1-4; and FIG. 7 shows a top view of the upper pulley wheel of FIG. 6.

In FIG. 1-4 the gangway construction in its entirety has been given the reference numeral 1. The gangway construction 1 comprises a support frame 2 which is supported on and mounted with a mounting frame part 2*a* to a deck of a vessel 3. An intermediate frame part 2b is rotatable around a vertical axis Y relative to the mounting frame part 2a. An end frame part 2c in turn is rotatable around a horizontal axis X relative to the intermediate frame part 2b. The end frame part 2c comprises two upwardly projecting box profiles 2c', 2c" (see FIG. 2) against the inner sides of which a first and second set of upper and lower pulley wheels 5, 6 and 5', 6' are rotatably mounted. Each of the pulley wheels 5, 6, 5', 6' is provided with two circumferential grooves along which first and second cables 8, 9 and 8', 9' are guided.

Along the end frame part 2c in between its two box profiles 2c', 2c", a longitudinal gangway 10 is moveably guided in its longitudinal direction Z. The gangway 10 comprises a front part 10a having a substantially horizontal walkway 11 and two vertical handrail safety side walls 12 mounted thereto. Further the gangway 10 comprises a rear part 10b having a substantially horizontal walkway 11 and two rectangular strengthening frames 13 mounted to the sides thereof. Each strengthening frame 13 has an upper support rail 14 and a lower boundary rail 15 as well as a forward mounting bar 16 and a backward mounting bar 17.

Each of the cables 8, 9, 8', 9' is mounted with one end to the forward mounting bar 16 and with its other end to the backward mounting bar 17. The upper support rails 14 run over the upper pulley wheels 5, 5'. The lower boundary rails 15 run with a small play along the lower pulley wheels 6, 6'.

As can be seen in FIG. 2, the first cable 8 is mounted to the forward mounting bar 16 at an upper mounting position 18 thereof, from there extends in a straight line parallel to the support rail 14 towards the upper pulley wheel 5. There the cable 8 runs in a clockwise direction over half the circumference of the upper pulley wheel 5, continues its way in the counter clockwise direction over half the circumference of the lower pulley wheel 6, and from there extends in a straight line parallel to the boundary rail 15 to a lower mounting position 19 to the backward mounting bar 17.

The second cable 9 is mounted to the backward mounting bar 17 at an upper mounting position 20 thereof, from there extends in a straight line parallel to the support rail 14 towards the upper pulley wheel 5. There the cable 9 runs in a counter clockwise direction over half the circumference of the upper pulley wheel 5, continues its way in the clockwise direction over half the circumference of the lower pulley wheel 6, and from there extends in a straight line parallel to the boundary rail 15 to a lower mounting position 21 to the forward mounting bar 17.

The upper mounting positions 18, 20 lie at substantially the same height as the upper side of the upper pulley wheel 5 (see FIG. 2). The lower mounting positions 19, 21 lie at substantially the same height as the lower side of the lower pulley wheel 6.

Together the cables 8, 9, the support rail 14, the boundary rail 15 and the pulley wheels 5, 6 form a first guiding subassembly.

The cables 8', 9' at the opposite side of the gangway 10 are connected to and guided along their strengthening frame 13' resp. their pulley wheels 5', 6' in a similar manner. Together the cables 8', 9', the support rail 14', the boundary rail 15' and the pulley wheels 5', 6' form a second guiding subassembly.

Beneath the walkway 11 of the rear gangway part 10b a third subassembly is provided. This third subassembly in similar manner comprises a first cable and second cable 8", 9" extending along the rear gangway part 10b and being guided in opposite directions over a left and right pulley wheel 5", 6". The lower boundary rails 15, 15' also form part of this third subassembly and are guided along the outer sides of the left and right pulley wheels 5", 6".

The pulley wheel 5 or 6 is coupled to an electromotor 25. A driving of the electromotor 25 sets the pulley wheel 5 in rotation and on the one hand acts a pulling force on either the cable 8 or 9 depending on the direction of rotation for driving it in rotation, while on the other hand acting a pushing force on the support rail 14. The other pulley wheels 5', 5", 6, 6', 6" automatically start rotating along with the pulley wheel 5 and together help in moving the entire gangway 10 in a smooth and easy manner in the desired forward or backward direction Z.

Between the end frame part 2c that is rotatable around the horizontal axis X and the intermediate frame part 2b a winch 28 is provided. In order to create sufficient moment for the winch 28, it is mounted at the upper end of an upwardly projecting box profile 2b', while its lifting cord 29 is connected to the upper end of the likewise upwardly projecting box profile 2c'. By suitably driving the winch 28, the gangway 10 can be lifted or lowered with its front end. At this front end the gangway 10 comprises a coupling device 30. The coupling device 30 comprises two sideway projecting horizontal rod parts 31 which can be lowered into hooks 32 which are fixedly connected at a certain height below sea level to an offshore object 33.

The end frame part 2c which is rotatable around the horizontal axis X comprises a backwardly directed guiding construction 40. A counterweight 41 is moveably guided over this guiding construction 40. This counterweight 41 can be moved by means of a suitable driving construction, which here is formed by a set of cables 42 on the one hand connected to the gangway 10 and on the other hand connected to the counterweight 41 while being guided over wheels 43 at the end of the guiding construction. The connection with the cables 42 is such that a moving of the gangway 10 in its longitudinal direction immediately results in a moving of the counterweight 41 in the opposite direction. Thus, the gangway construction 1 can be kept substantially weight balanced around its horizontal axis X in all extended positions of the gangway and at all slope angles of the gangway.

Stairs 50 are provided for gaining access to the gangway 10. Personnel and/or equipment which need to be transferred between the vessel 3 and the offshore object 33 can climb up the stairs 50 to enter the gangway 10 at its rear part 10b. From there they can walk over the walkway 11 towards the offshore object 33 and there climb upwards onto the offshore object 33 via a ladder 51 mounted thereto.

During use the vessel 3 is sailed towards a position close to the offshore object 33. The vessel 3 is kept in this position by hand or for instance by means of GPS supported dynamic positioning. In that vessel position the gangway 10 is moved forward by means of a suitable driving of the electromotor 25. With this the front end of the gangway 10 is brought with its rod parts 31 to a position somewhat higher than the position of the hooks 32 by means of a suitable driving of the winch 28. For this lifting of the front end of the gangway 10 only a minimal force is required of the winch 28, since the forward shifting of the weight of the gangway 10 has been compensated by a backward moving of the counterweight 41. As soon as the rod parts 31 bump against boat landing fenders 55 of the offshore object 33, the winch 28 is driven such that the front end of the gangway 10 is lowered until the rod parts 31 grip into the hooks 32. From that moment on the gangway 10 and thus also the vessel 3 is connected to the offshore object 33. It is possible to then set the various degrees of freedom of the gangway construction 1 free such that the gangway 10 can freely rotate around its horizontal and vertical axis X, Y and freely move forward or backward in its longitudinal direction relative to the support frame 2. The vessel may then be kept in its position close to the offshore object by hand, dynamic positioning means, or the like. When it is desired to sail away again, the above actions can be performed in the opposite manner.

In a variant it is not tried to keep the vessel 2 in its position close to the offshore object 33. For example small vessels may not be equipped with such dynamic positioning means. The vessel 2 under the influence of waves, current and wind, may then start to drift away from the offshore object 33. This results in a pulling of the vessel 2 on the gangway 10. Because of this the gangway 10 may be forced to move to its most extended forward position were it comes to rest against a stop. Thus the gangway 10 depending on the weather conditions may get strained with a lot of tension. In order to minimize this tensioning of the gangway 10, a separate tension release organ 60, preferably a flexible organ like a cable, is provided which gets to extend between the vessel 2 and the offshore platform 33 as soon as the gangway 10 is connected thereto. In particular the release organ 60 is connected with one end to the vessel 2 and with its other end to the front end of the gangway 10, for example with the coupling device 30. The release organ 60 is given a length which is such that it gets pulled tight as soon as the gangway 10 starts reaching its most extended most forward position, and the release organ 60 starts to hang loose again if the gangway 10 starts retracting inwards again. Thus the release organ 60 is able to prevent the gangway 10 from getting tensioned too much, by automatically starting to act as mooring element as soon as the vessel 2 starts drifting away too much from the offshore object 33.

Any (varying) moments acting on the gangway around the horizontal axis X, for example because of personnel walking over it or equipment being moved over it, can easily be dealt with by the tension of the cables 8, 9, 8', 9' of the first and second subassemblies. Any (varying) moments acting on the gangway around the vertical axis X, for example caused by strong wind, can easily be dealt with by the tension of the cables 8'', 9'' of the third subassembly.

In FIG. 5a the cable 8 is not shown. Instead only the cable 9 together with the pulley wheels 5, 6, the forward connecting position 16' on the mounting bar 16 and the backward connecting position 17' on the mounting bar 17 are schematically shown. The pulley wheels 5, 6 are connected to the frame 2, whereas the connecting positions 16', 17' are connected to the gangway 10. In FIG. 5b the cable 9 and its connecting positions 16', 17' are even shown without the pulley wheels 5, 6. Thus the S-shaped run with two open loops of the cable 9 along the set of pulley wheels 5, 6 is clearly visible. The two open loops are mirrored, the one along the lower pulley wheel 6 runs in the counter clockwise rotational direction, whereas the one along the upper pulley wheel 5 runs in the clockwise rotational direction. Thus the cable has two bending directions.

In FIGS. 6a and 6b an alternative run for the cable is shown. Similar parts have been given the same reference numerals. Now it can be seen that the cable 9 runs with an open loop along merely a quarter of the lower pulley wheel 6, and as a closed loop along three quarters of the upper pulley wheel 5. The two loops run in the same counter clockwise rotational direction. Thus the cable has only one bending direction. In order to prevent the forward cable part 9' to bump against the backward cable end 9'', the rotational axis 5' of the upper pulley wheel 5 has been given a somewhat slanted position of a few degrees (for example between 0-20 degrees) relative to the tangentially directed orientation of the rotational axis 6' of the lower pulley wheel 6 (see FIG. 7).

Besides the embodiment shown numerous variant embodiments are possible. For example the gangway construction can be constructed in other shapes and/or dimensions. It is also possible to switch the pulley wheels and cables in position, that is to say to connect the pulley wheels with the moving gangway and the cables with the support frame. Instead of the pulley wheels being positioned straight above one another they can also be mounted to the frame with their axes of rotation in a slanted position beneath one another. Instead of the gangway only performing a shifting movement relative to the support frame, it is also possible to provide the gangway with a telescoping part. The coupling device can be of any suitable type, and for example have actuatable claws which can be actuated to fixedly grip around a connecting bar. Instead of the cables and support/boundary rails only extending along a rear part of the gangway, it is also possible to have them extend along the entire length of the gangway. It is also possible to provide the gangway construction on the offshore object, instead of on the vessel, and from there keep it accurately positioned relative to the vessel or connect it with a vessel provided with a suitable connecting organ. It is also possible to have the gangway form an accurately positioned access or connection between two vessels approaching each other at sea.

Thus, according to the invention a very light weight and mechanically simple gangway construction is provided with which moment in a plurality of rotational directions acting on the gangway can easily be dealt with by means of a simple set of cables extending in the longitudinal direction of the gangway.

The invention claimed is:

1. A gangway construction for providing access between a vessel and an offshore object, comprising:
    a support frame mounted to either one of the vessel and the offshore object;
    a guiding assembly provided on a guiding part of the support frame;
    a longitudinal gangway movably guided over the guiding assembly in a longitudinal direction relative to the frame;
characterized in that,
    the guiding assembly comprises at least a first subassembly having:
        an upper and lower pulley wheel mounted rotatable to either one of the frame and the gangway with their axis of rotation positioned at a vertical distance from each other; and
        a first cable connected to the other one of the frame and the gangway with one cable end fixedly connected at a forward connecting position lying at a front side of the pulley wheels and with the other cable end fixedly connected at a backward connecting position at a back side of the pulley wheels and with the cable extending in the longitudinal direction between the forward and backward connecting positions along at least part of said other one of the frame and the gangway, with the first cable, seen in said longitudinal direction, extending from its forward connecting position towards the lower pulley wheel, being guided along at least part of the back side of the circumference of the lower pulley wheel and over at least part of the front side of the circumference of the upper pulley wheel, and from the upper pulley wheel extending towards its backward connecting position.

2. A gangway construction according to claim 1, wherein the subassembly further comprises:
    a second cable connected to said other one of the frame and the gangway with one cable end fixedly connected at a forward connecting position lying at a front side of the pulley wheels and with the other cable end fixedly connected at a backward connecting position at a back side of the pulley wheels and with the cable extending in the longitudinal direction between this forward and backward connecting position along at least part of said other one of the frame and the gangway, with the second cable being guided in a mirrored way relative to the first cable over an upper and lower pulley wheel mounted rotatable to said either one of the frame and the gangway with their axis of rotation positioned at a vertical distance from each other, with the second cable, seen in the longitudinal direction, extending from its backward connecting position towards the lower pulley wheel, being guided along at least part of the front side of the circumference of the lower pulley wheel and over at least part of the back side of the circumference of the upper pulley wheel, and from the upper pulley wheel extending towards its forward connecting position.

3. A gangway construction according to claim 1, wherein the subassembly further comprises:
an upper support rail extending along at least part of said other one of the frame and the gangway, which upper support rail is supported on and guided over one of the pulley wheels during a movement of the gangway in the longitudinal direction.

4. A gangway construction according to claim 3, wherein the subassembly further comprises:
a lower boundary rail extending along at least part of said other one of the frame and the gangway, which lower boundary rail extends beneath one of the pulley wheels during a movement of the gangway in the longitudinal direction.

5. A gangway construction according to claim 1, wherein a drive is provided for driving at least one of the pulley wheels in rotation for moving the gangway in the longitudinal direction.

6. A gangway construction according to claim 5, wherein the drive is an electric drive that is battery operated.

7. A gangway construction according to claim 1, wherein a second subassembly is provided, and wherein the first and second subassemblies are provided on opposite left and right sides of the gangway.

8. A gangway construction according to claim 7, wherein a third subassembly is provided having:
a left and right pulley wheel mounted rotatable to either one of the frame and the gangway with their axis of rotation positioned at a horizontal sideways distance from each other; and
a first cable connected to the other one of the frame and the gangway with one cable end fixedly connected at a forward connecting position lying at a front side of the pulley wheels and with the other cable end fixedly connected at a backward connecting position at a back side of the pulley wheels and with the cable extending in the longitudinal direction between this forward and backward connecting position along at least part of said other one of the frame and the gangway, with the first cable of the third subassembly, seen in the longitudinal direction, extending from its forward connecting position towards the left pulley wheel, being guided along at least part of the back side of the circumference of the left pulley wheel and over at least part of the front side of the right pulley wheel, and from the right pulley wheel extending towards its backward connecting position.

9. A gangway construction according to claim 8, wherein the third subassembly further comprises:

a second cable connected to said other one of the frame and the gangway with one cable end fixedly connected at a forward connecting position lying at a front side of the pulley wheels and with the other cable end fixedly connected at a backward connecting position at a back side of the pulley wheels and with the cable extending in the longitudinal direction between the forward and backward connecting positions along at least part of said other one of the frame and the gangway, with the second cable of the third subassembly being guided in a mirrored way over a left and right pulley wheel mounted rotatable to the frame with their axis of rotation positioned at a horizontal sideways distance from each other, with the second cable of the third subassembly, seen in the longitudinal direction, extending from its backward connecting position towards the left pulley wheel, being guided along at least part of the front side of the circumference of the left pulley wheel and over at least part of the back side of the circumference of the right pulley wheel, and from the right pulley wheel extending towards its forward connecting position.

10. A gangway construction according to claim 8, wherein the third subassembly further comprises:
at least one boundary rail extending along at least part of said other one of the frame and the gangway, which boundary rail extends along at least one side of the pulley wheels of the third subassembly during a movement of the gangway in the longitudinal direction.

11. A gangway construction according to claim 1, wherein the guiding part of the support frame on which the guiding assembly is provided is mounted rotatable around a horizontal axis of rotation relative to a base part of the support frame, and wherein a counterweight is provided at a position behind the horizontal axis of rotation and which counterweight acts on the guiding part of the support frame, and is moveable relative to the horizontal axis of rotation in a direction opposite to a movement of the gangway in the longitudinal direction.

12. A gangway construction according to claim 1, wherein the cable extends over only a rear part of the gangway.

13. A gangway construction according to claim 1, wherein the cable is tightened, in particular up to a tension of at least 1 kN.

14. A gangway construction according to claim 1, further comprising:
a coupling device provided at a front end of the gangway for connecting the gangway to the other one of the vessel and the offshore object.

15. A gangway construction according to claim 1, wherein the cable is guided in a first rotational direction along at least part of the circumference of one of the pulley wheels and in a second opposite rotational direction over at least part of the circumference of the other one of the pulley wheels of a subassembly.

16. A gangway assembly according to claim 15, wherein the cable of the first subassembly is guided in a counter clockwise direction along at least part of the circumference of the lower pulley wheel and in a clockwise direction over at least part of the circumference of the upper pulley wheel.

17. A gangway construction according to claim 1, wherein the cable is guided in a first rotational direction along at least part of the circumference of one of the pulley wheels and in the same first rotational direction over more than half the circumference of the other one of the pulley wheels.

18. A vessel provided with a gangway construction mounted thereto according to claim 1.

19. Method for providing access between a vessel and an offshore object with each other by means of a gangway construction according to claim 1, comprising the steps of:
  moving the gangway through the guiding assembly in the longitudinal direction relative to the support frame mounted to either one of the vessel and the offshore object, while having the pulley wheels rotating and the cable displacing in one rotational direction over the upper pulley wheel and in the opposite rotational direction over the lower pulley wheel.

20. Method according to claim 19, wherein a moment acting on the gangway is counteracted by means of loops of the cable running around the pulley wheels being pulled tight against the pulley wheels.

* * * * *